Feb. 2, 1965   J. J. ROBERTS ETAL   3,168,345
COLLAPSIBLE COVER FOR TRUCKS
Filed March 22, 1963   4 Sheets-Sheet 1

INVENTORS
JAMES J. ROBERTS
LOUIS J. COSTANZA
BY

ATTORNEY

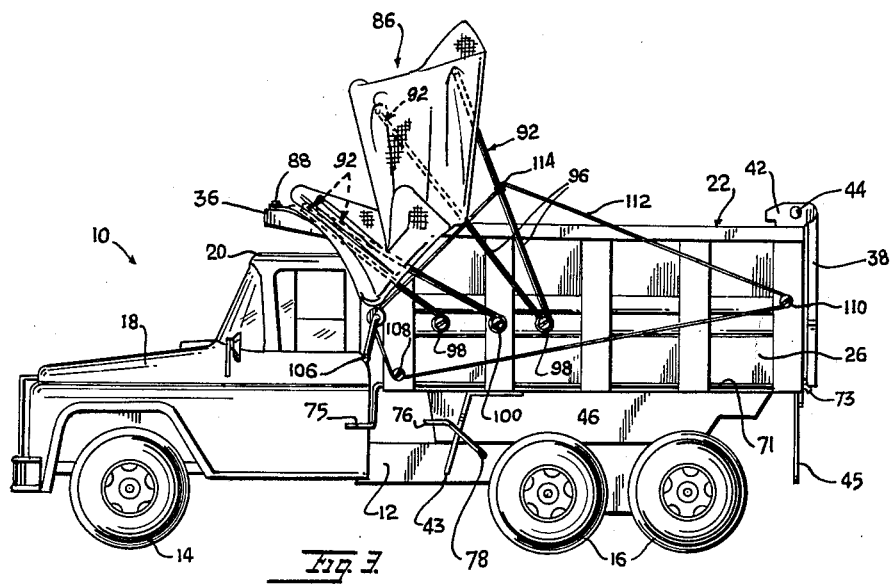

Feb. 2, 1965  J. J. ROBERTS ETAL  3,168,345
COLLAPSIBLE COVER FOR TRUCKS
Filed March 22, 1963  4 Sheets-Sheet 3
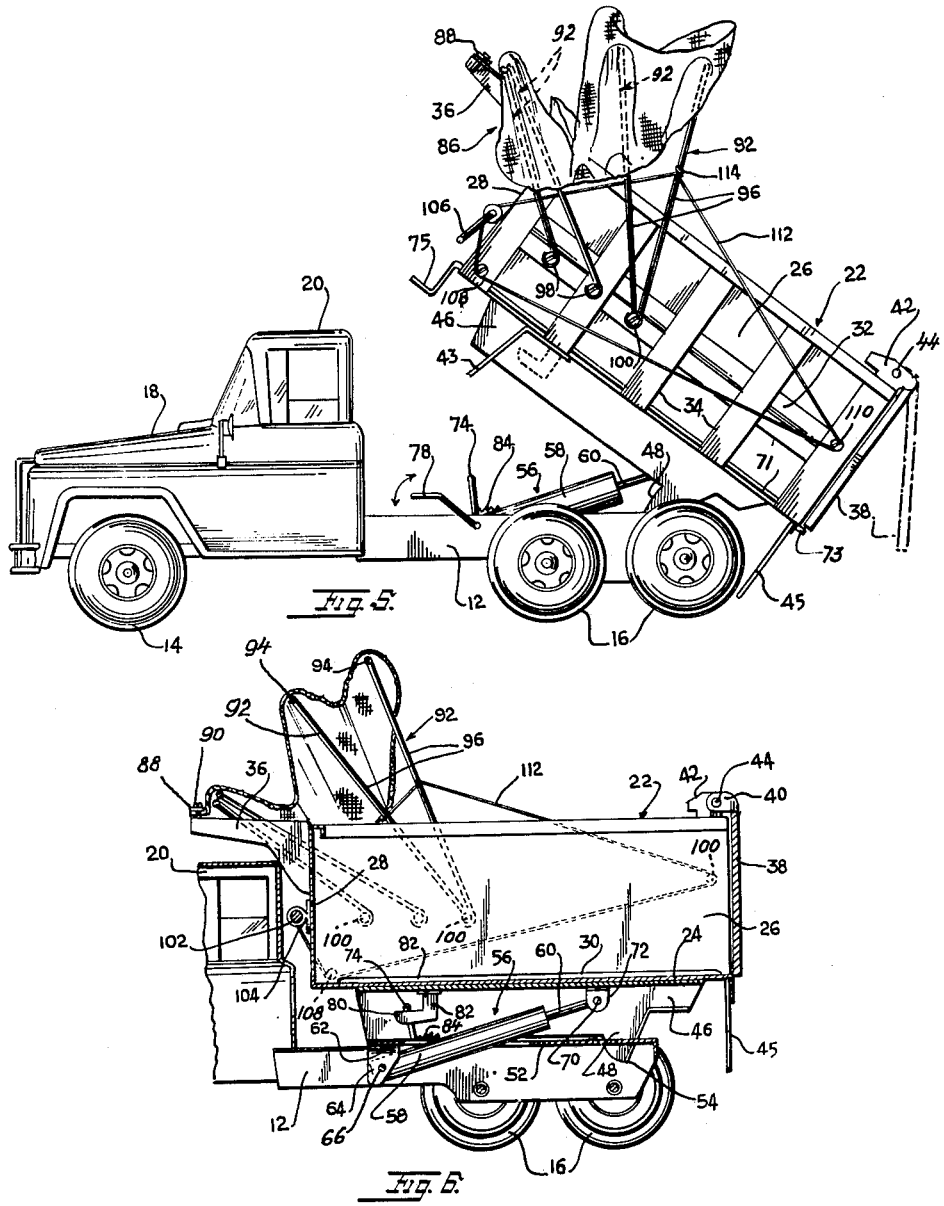
INVENTORS
JAMES J. ROBERTS
LOUIS J. COSTANZA
BY
*Jotton Holacek*
ATTORNEY

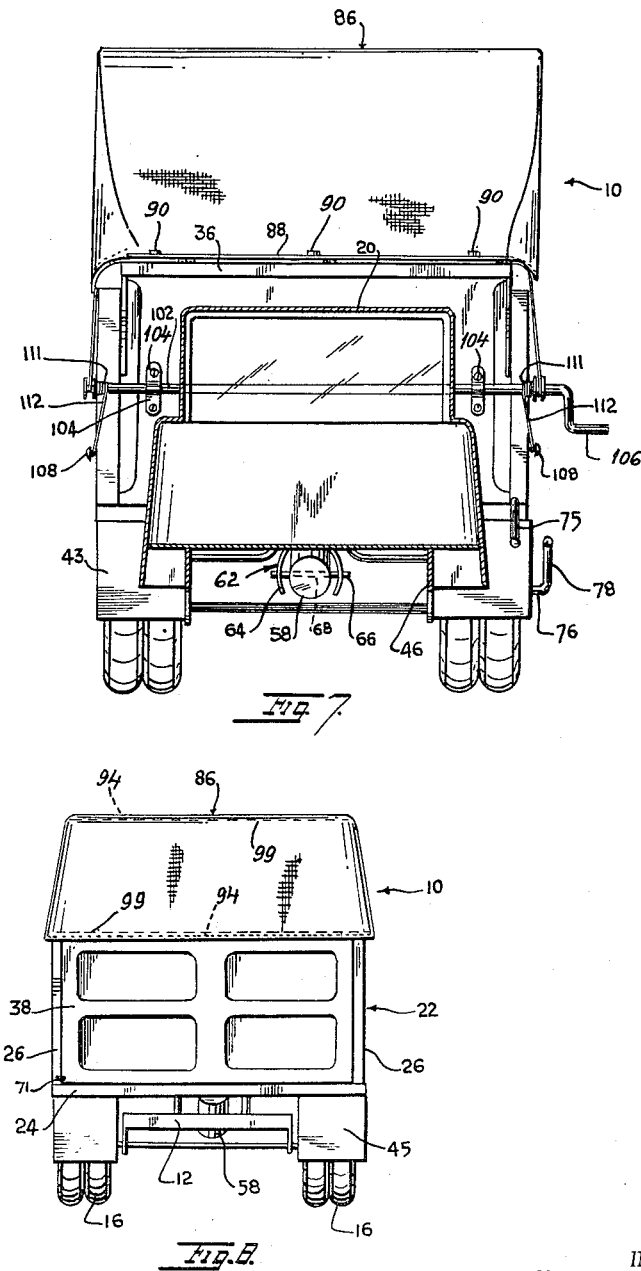

United States Patent Office 3,168,345
Patented Feb. 2, 1965

1

3,168,345
COLLAPSIBLE COVER FOR TRUCKS
James J. Roberts, 380 Copeland Ave., Lyndhurst, N.J., and Louis J. Costanza, 16 Nottington Terrace, Clifton, N.J.
Filed Mar. 22, 1963, Ser. No. 267,150
1 Claim. (Cl. 296—100)

This invention relates generally to trucks and more particularly to a new and useful improvement in a flexible and collapsible cover for a dump truck.

Dump trucks are used for transporting and delivering loose sand, stone and the like that has to be delivered at the site of the job by tilting the truck and dumping the material. Such dump trucks usually comprise a body with an open top so that the material is liable to spill over the top of the truck into the path of oncoming vehicles, causing injury and damage to persons and vehicles as well as loss of material. In order to avoid this spilling over, resort has been had to placing a flexible and collapsible cover over the top of the material, securing same to the top of the vehicle. Ordinarily such flexible canvas covers are secured to the vehicle at the rear thereof making it necessary to fold the cover at a point adjacent the rear of the truck in the way of movement of the rear swingable door of the truck and in the way of the material spilling out through the door.

It is therefore an object of the present invention to provide a dump truck with a flexible collapsible cover that is adapted to be automatically folded remote from the rear of the truck so as to be out of the way of the spilling cargo.

Another object of the invention is to provide a collapsible flexible cover for a dump truck that may be readily and easily manipulated to permit free and unobstructed dumping action of the body of the truck when the body is tilted for discharging its load.

A further object is to provide a collapsible cover for a dump truck which may be easily manipulated to permit exposure of a limited portion of the load-carrying space of the body of the truck at will.

Still another object of the invention is to provide a flexible collapsible cover for a truck body that is strong, durable, efficient, simple and comparatively inexpensive to construct, also one in which the several parts will not be likely to get out of working order.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 3 is a side view thereof, the cover being shown in inoperative collapsed position.

FIG. 4 is a similar view from the opposite side thereof.

FIG. 5 is a view similar to FIG. 3 showing the truck body in tilted dumping position.

FIG. 6 is a view through the vertical center of the dumping body of the truck of FIG. 5 showing the body in normal untilted position.

FIG. 7 is a cross-sectional view taken substantially on the line 7—7 of FIG. 2.

FIG. 8 is a rear view of the dump truck on a reduced scale.

2

Figure 1:
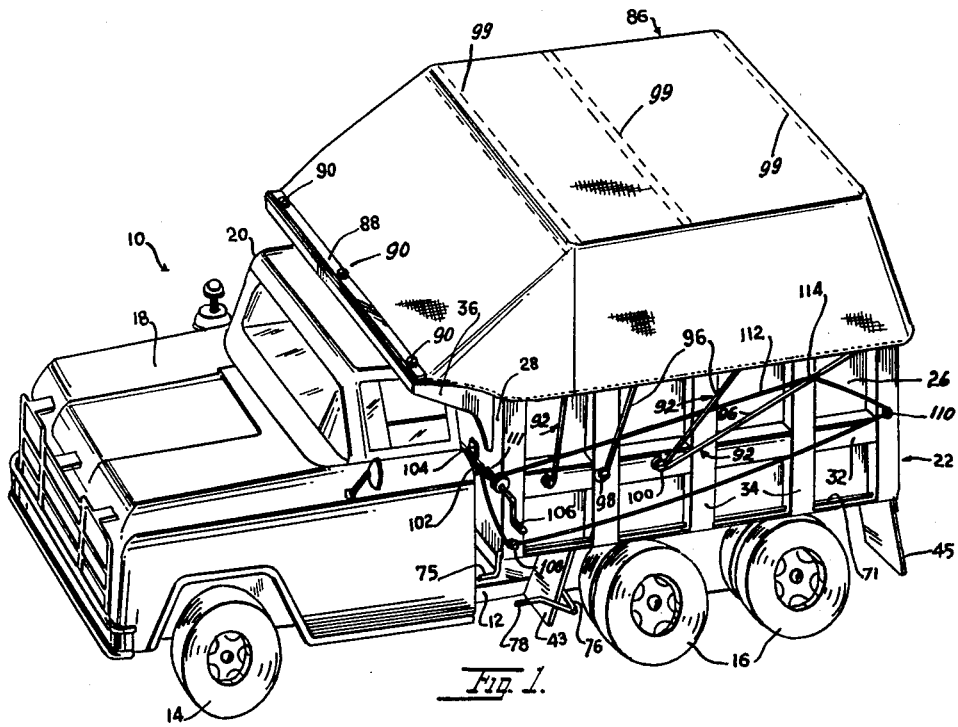
FIG. 1 is a perspective view of a dump truck embodying a cover made in accordance with the present invention, the cover being shown in operative extended position.
Figure 2:
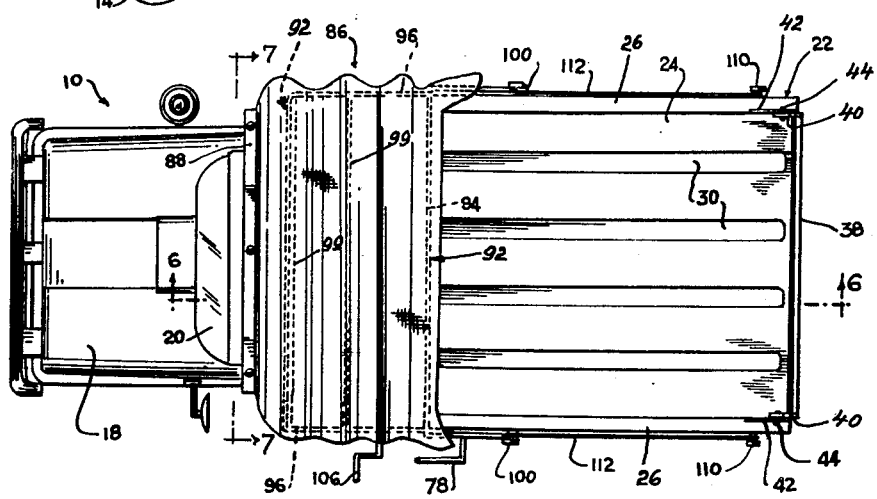
FIG. 2 is a top plan view thereof, the cover being shown in inoperative collapsed position.

Referring in greater detail to the drawings, in FIG. 1 an automotive dump truck embodying the present invention is shown and designated generally by the reference numeral 10. The truck 10 comprises the usual chassis 12 mounted on front wheels 14 and rear wheels 16. A hood 18 is supported on the chassis over the front wheels 16, and an operator's compartment 20 rearwardly of the hood and above the same.

A truck body 22 is tiltably mounted on the chassis movable in a vertical plane. The body includes a floor 24, side walls 26 and front wall 28 and is open at the top. The floor is shown with longitudinally disposed spaced ribs 30, and the side walls 26 are shown with elongated central ribs 32 and cross ribs 34. A boot extension 36 extends from the top of the front wall forwardly thereof over the operator's compartment 20. A swinging door 38 normally closes the rear of the body. Door 38 is formed with inwardly extending brackets 40 at its top at the ends thereof. The brackets 40 are perforated and overlap perforated brackets 42 extending outwardly on the top rear ends of the side walls 26. Hinge pins 44 extend through the perforations in the overlapped brackets 42 so as to mount the door hingedly with its free end at the bottom, the door swinging outwardly and upwardly. Rigid mudguards 43 are preferably fastened to the floor 24 of the truck body and depend therefrom in front of the forwardmost rear wheel 16 and flexible mudguards 45 are secured to the floor of the truck body and depend rearwardly of the rear wheels 16.

The truck body 22 is tiltably connected to the rear of the chassis by means of elongated rails 46 depending from the floor of the body and extending substantially the length of the body. At the rear of the body, the rails are formed with downwardly extending bearing lugs 48 extending through closed slots formed in the floor 52 of the chassis. The extreme ends 54 of the lugs are bent below the floor to prevent withdrawal of the lugs 48. The rear end edges of the end walls of the slots serve as fulcrum points around which the truck body tilts in a vertical plane.

A hydraulic truck body lifting device 56 serves automatically to push the truck body upwardly around its fulcrum points and to retract the body to normal horizontal position as shown in FIG. 1. This device includes a closed cylinder 58 with fluid therein and an elongated piston rod 60 extending outwardly through an opening at one end of the cylinder. The cylinder is supported at a slight angle to the horizontal as shown in FIGS. 5 and 6 by pivotally connecting one end thereof to an inverted U-shaped bracket 62 having holes in the side legs 64 thereof to receive a pivot pin 66 passing through a transverse passage 68 in the adjacent end of the cylinder. The bracket 62 is fastened to and depends from the floor of the chaissis. The free end of the protruding piston rod 60 is pivotally connected to a cotter pin 70 supported across an inverted U-shaped bracket 72 fastened to and depending from the floor 24 of the truck body 22, adjacent the rear of the truck body.

The truck body 22 is releasably held in normal horizontal position as shown in FIG. 1 by a pivoted inverted U-shaped keeper 74 having a lateral extension 76 with a crank handle 78 on the end thereof, outwardly of the body of the truck. The keeper engages on the nose portion 80 of a bracket 82 depending from the floor of the truck body. A coil spring 84 having one end secured to the keeper and its other end anchored to the floor of the chassis holds the keeper in holding position. A latching device, at one side of the truck body, comprising an elongated rod 71 with a bent end 73 at its rear and a crank handle 75 at the front, releasably holds the rear door 38 against opening. A turn of the handle 78 anticlockwise as viewed in FIG. 3 moves the keeper 74 away from the nose portion 80 of the bracket 82 whereupon the fluid in the cylinder pushes the piston rod 60 outwardly forcing the front of the truck body 22 upwardly and the rear of the body downwardly as shown in FIG. 5.

In accordance with the invention, a collapsible flexible closure 86 is provided for the open top of the truck body 22. The closure or cover is mounted independently of the truck body so as not to alter its normal center of gravity and is movable to a position at which the truck body may have free and unobstructed dumping action. The closure or cover 86 shown in FIG. 1 is formed of flexible sheet material, such as canvas. One end of the cover is clamped to the front of the top surface of the boot extension 36 by means of a clamping plate 88 secured in position by screws 90. The remainder of the cover is supported at spaced intervals on a plurality of longitudinally spaced inverted U-shaped bows 92, each bow comprising a top bar 94 and side bars 96. The lower end of each side bar 96 is turned upon itself forming a terminal loop 98 which loosely encircles the shank of a headed bolt 100. The bolts are arranged in aligned spaced relation along the central ribs 32 of the side walls 26 of the truck body 22, adjacent the front of the body. The side bars of the rear and penultimate bows 92 are shown encircling the same bolt, the side bars of the rear end bow being longer than the side bars of the other bows. The top bars 94 of the bows 92 are connected by stitching 99 to intermediate portions of the cover. The side bars 96 of the rearmost bow 92 are stitched to the rear end edge of the cover.

Mechanism is provided for swinging the bows 92 around the bolts 100 as pivot points, rearwardly and forwardly of the truck body. This mechanism includes a shaft 102 journaled in bracket bearings 104 secured to the front surface of the front wall 28 of the truck body. The shaft extends across the front wall with the ends thereof protruding slightly outwardly thereof. A crank handle 106 is suitably fastened to one of the protruding ends of the shaft for turning the shaft. A pulley 108 is secured to and protrudes outwardly of each side wall 26 of the truck body below the protruding end of the shaft 102. Another pulley 110 is secured to and protrudes outwardly of each side wall 26 of the truck body on a horizontal line with the protruding end of shaft 102 as viewed in FIG. 3.

At each side, a cable 112 has one end anchored to the adjacent protruding end of the shaft 102 for winding therearound, the cable then passing rearwardly around the rear pulley 110 and then forwardly around the front pulley 108 with the other end anchored to the shaft 102 inwardly of said one end of the cable as indicated at 111. A reach of the cable 112 on its way to the rear pulley 110 is fastened to the adjacent side bar 96 of the rearmost bow 92 midway its ends as indicated at 114. By reason of this arrangement of cables 112, when the shaft is turned by the handle clockwise as viewed in FIG. 3, to pull the cable 112 in the direction of the arrow at the right of FIG. 1, the bows 92 are pivoted rearwardly and downwardly to the extended position shown in FIG. 1 thereby closing the cover over the top of the truck body.

When the shaft is turned in the opposite direction, or counterclockwise, the upper reach of the cable is pulled in the direction of the arrow at the left in FIG. 1, thereby moving all of the bows 92 forwardly and downwardly to collapsed condition at the front of the truck body or top when the truck body is in raised condition as shown in FIG. 5. A cable is provided on each side of the truck body in order to provide an equal force on the bows to raise them to the extended or erect position and lower them to the collapsed position.

As shown in FIG. 1, the cover 86 when in extended position forms a closure on the top of the truck body 22. When the bows 92 are in extended condition, the cover is held taut. When the bows are in collapsed condition as shown in FIGS. 2 to 6, inclusive, the cover is folded into compact condition at the front of the truck body remote from the rear thereof thereby permitting free and unobstructed dumping action.

While we have illustrated and described the preferred embodiment of our invention, it is to be understood that we do not limit ourselves to the precise construction herein disclosed and that various changes and modifications may be made within the scope of the invention as defined in the appended claim.

Having thus described our invention, what we claim as new, and desire to secure by United States Letters Patent is:

In an automotive truck having a chassis and an open top dump body having spaced parallel side walls, a front wall having a boot secured to the upper end thereof and extending forwardly therefrom, and a pivoted gate at the rear end thereof, means pivotally securing said body to said chassis adjacent the rear ends thereof; a collapsible cover of flexible material for the open upper end of said body having the forward end thereof permanently secured to the forward edge of said boot, and means mounting said cover on said body for movement between extended closed position and collapsed open position over said boot, said means comprising; a plurality of spaced horizontally aligned pivot bolts secured to one side of said body intermediate the top and bottom and adjacent the forward end thereof, and a plurality of pivot bolts similarly secured to the other side of said body in transverse axial alignment with the pivot bolts secured to the said one side of said body, a plurality of inverted U-shaped bows having a top transverse bar and radial side bars at the ends of the transverse bar, two of which bows are pivotally secured to the rearmost pair of transversely aligned pivot bolts and one each of which is pivotally secured to each of the other transversely aligned pivot bolts, means by which said cover is permanently secured to the transverse bars of said bows, said bows extending radially upwardly and rearwardly from said pivot bolts when maintaining said cover in extended closing position over said body, and upwardly and forwardly when maintaining said cover in collapsed open position, and means by which said bows are adapted to be rotated back and forth about said pivot bolts between cover extended position and cover collapsed position, said means comprising; a transversely disposed shaft which is rotatably mounted on the front wall of said body and extends out beyond each side of said body, a crank by which said shaft is adapted to be rotated secured to one end of said shaft, a first pair of axially aligned pulleys one of which is rotatably mounted on each side wall of said body adjacent said front wall below the plane of said shaft, a second pair of axially aligned pulleys one of which is rotatably mounted on each side wall of said body adjacent the rear end of said body above the plane of said shaft, a pair of cables one at each side of said body, each of said cables having one end thereof secured to said shaft and wound thereon in one direction and the other end thereof secured to said shaft and wound thereon in the opposite direction, each of said cables extending downwardly around one of said first pair of pulleys thence rearwardly and upwardly around one of said second pair of pulleys and then forwardly to said shaft, said cables being connected to the side bars of said rearmost bow intermediate the transverse bar and the pivoted lower ends thereof, whereby rotation of said shaft will swing said bows from their upwardly and rearwardly extending position to their upwardly and forwardly extending position thereby moving said cover from extended closed position to collapsed open position, and rotation of said shaft in the opposite direction will swing said bows back to their upwardly and rearwardly extending position and thereby move said cover from collapsed open position back to extended closed position.

(References on following page)

References Cited by the Examiner

UNITED STATES PATENTS

| | | | |
|---|---|---|---|
| 345,821 | 6/86 | Abbott | 296—105 |
| 853,512 | 5/07 | Hendershot | 298—38 |
| 1,263,759 | 4/18 | Hanaway | 296—105 |
| 1,856,280 | 5/32 | Helms | 296—100 |
| 1,863,957 | 6/32 | Woolcott | 296—105 |
| 2,226,901 | 12/40 | Fairbanks | 298—23 |
| 2,806,477 | 9/57 | Fritsche | 135—4 |
| 3,062,587 | 11/62 | Miller | 298—23 X |

A. HARRY LEVY, *Primary Examiner.*

PHILIP ARNOLD, *Examiner.*